United States Patent
Kitami et al.

(10) Patent No.: US 6,925,902 B2
(45) Date of Patent: Aug. 9, 2005

(54) WORM SPEED CHANGE APPARATUS AND ELECTRIC POWER STEERING APPARATUS

(75) Inventors: Etsurou Kitami, Yamatokooriyama (JP); Tomohiro Maekawa, Habikino (JP); Terukazu Nakajima, Yamatotakada (JP)

(73) Assignee: Koyo Seiko Co., Ltd., Osaka (JP)

( * ) Notice: Subject to any disclaimer, the term of this patent is extended or adjusted under 35 U.S.C. 154(b) by 88 days.

(21) Appl. No.: 10/259,608

(22) Filed: Sep. 30, 2002

(65) Prior Publication Data

US 2003/0070866 A1 Apr. 17, 2003

(30) Foreign Application Priority Data

Oct. 3, 2001 (JP) ........................................ 2001-307722

(51) Int. Cl.$^7$ ................................................. F16H 1/16
(52) U.S. Cl. ..................... 74/425; 74/388 PS; 74/89.14
(58) Field of Search ............................... 74/89.14, 425, 74/388 PS; 384/517, 563, 903

(56) References Cited

U.S. PATENT DOCUMENTS

| | | | | |
|---|---|---|---|---|
| 3,583,253 A | * | 6/1971 | Grimshaw et al. ............ | 74/425 |
| 4,364,615 A | * | 12/1982 | Euler ........................... | 384/517 |
| 4,885,948 A | * | 12/1989 | Thrasher et al. ........... | 74/89.14 |
| 5,450,916 A | | 9/1995 | Budaker et al. | |
| 5,505,548 A | * | 4/1996 | Stewart ....................... | 384/537 |
| 5,605,071 A | | 2/1997 | Buchanan, Jr. | |
| 5,823,055 A | * | 10/1998 | Siler ............................ | 74/425 |
| 6,247,376 B1 | * | 6/2001 | Zhou et al. .................... | 74/425 |
| 6,491,130 B1 | * | 12/2002 | Honaga et al. .............. | 180/444 |
| 6,543,569 B1 | * | 4/2003 | Shimizu et al. .............. | 180/444 |

FOREIGN PATENT DOCUMENTS

| | | | | |
|---|---|---|---|---|
| CH | 366185 | | 1/1963 | |
| FR | 2229293 | | 12/1974 | |
| JP | 2001163228 A | * | 6/2001 | ............ B62D/3/12 |
| WO | WO 99/65758 | | 12/1999 | |

* cited by examiner

*Primary Examiner*—David M. Fenstermacher
(74) *Attorney, Agent, or Firm*—Rabin & Berdo P.C.

(57) ABSTRACT

There is provided a worm speed change apparatus comprising a worm shaft and a worm wheel meshed therewith. Rolling elements are rotatably disposed between a raceway groove formed directly in at least one of end portions of the worm shaft, and a bearing outer ring held by a housing. The worm shaft is directly supported by the rolling elements.

10 Claims, 4 Drawing Sheets

WORM SPEED CHANGE APPARATUS AND ELECTRIC POWER STEERING APPARATUS

CROSS REFERENCE TO RELATED APPLICATION

This Application claims priority benefits under 35 USC Article 119 of Japanese Patent Application Serial No. 2001-307722, the disclosure of which is incorporated herein by reference.

BACKGROUND OF THE INVENTION

1. Field of the Invention

The present invention relates to a worm speed change apparatus having a worm shaft and a worm wheel to be meshed therewith, and also relates to an electric power steering apparatus comprising this worm speed change apparatus.

2. Description of Related Art

Generally, an electric power steering apparatus is arranged such that a steering assistance electric motor is reduced in the number of rotations through a speed reducer and that the resulting reduced rotational force is transmitted to a steering mechanism such as a rack-and-pinion mechanism or the like. A worm speed reducer is often used as the above-mentioned speed reducer.

In a worm speed reducer, both ends of the worm shaft meshed with the worm wheel serving as a speed reduction gear, are rotatably supported by a housing through respective bearings each comprising inner and outer rings and rolling elements.

In such an arrangement, the worm shaft, the inner rings, the rolling elements and the outer rings are disposed in the diametral direction of the worm shaft. This disadvantageously increases not only the number of component elements, but also the size in the diametral direction of the worm shaft in its entirety. Further, while the worm shaft is under rotation, its axis disadvantageously easily swings transversely due to the increased number of component elements.

SUMMARY OF THE INVENTION

It is an object of the present invention to provide a small and economical worm speed change apparatus and electric power steering apparatus in each of which the worm shaft can be rotated at high positional precision.

To achieve the object above-mentioned, the present invention provides, as a preferred phase, a worm speed change apparatus comprising: a worm shaft having a pair of end portions; a worm wheel meshed with the worm shaft; a raceway groove formed directly in at least one of the end portions of the worm shaft; a bearing outer ring which is held by a housing and which is opposite to the raceway groove; and a plurality of rolling elements rotatably disposed between the bearing outer ring and the raceway groove, at least the one of the end portions of the worm shaft being directly received and rotatably supported by the rolling elements.

According to the present invention, the raceway groove is formed directly in the worm shaft. This enables the conventional bearing inner ring to be eliminated. This reduces the worm speed change apparatus in size in the diametral direction of the worm shaft. Further, the reduction not only in the number of component elements, but also in the number of assembling steps, lowers the production cost. Further, the conventional step of pressing the end portion of the worm shaft into the bearing inner ring, can be eliminated, thus further reducing the production cost. Further, the rotational runout precision of the axis of the worm shaft can be improved by reducing the number of component elements.

The present invention provides, as another preferred phase, an electric power steering apparatus comprising: a steering assistance electric motor; and a worm speed change apparatus for changing the number of rotations of the electric motor, and this worm speed change apparatus comprises: a worm shaft having a pair of end portions; a worm wheel meshed with the worm shaft; a raceway groove formed directly in at least one of the end portions of the worm shaft; a bearing outer ring which is held by a housing and which is opposite to the raceway groove; and a plurality of rolling elements rotatably disposed between the bearing outer ring and the raceway groove, the at least the one of the end portions of the worm shaft being directly received and rotatably supported by the rolling elements. According to the embodiment above-mentioned, a small and economical electric power steering apparatus can be obtained.

DESCRIPTION OF THE PREFERRED EMBODIMENTS

The following description will discuss preferred embodiments of the present invention with reference to the attached drawings.

Figure 1:
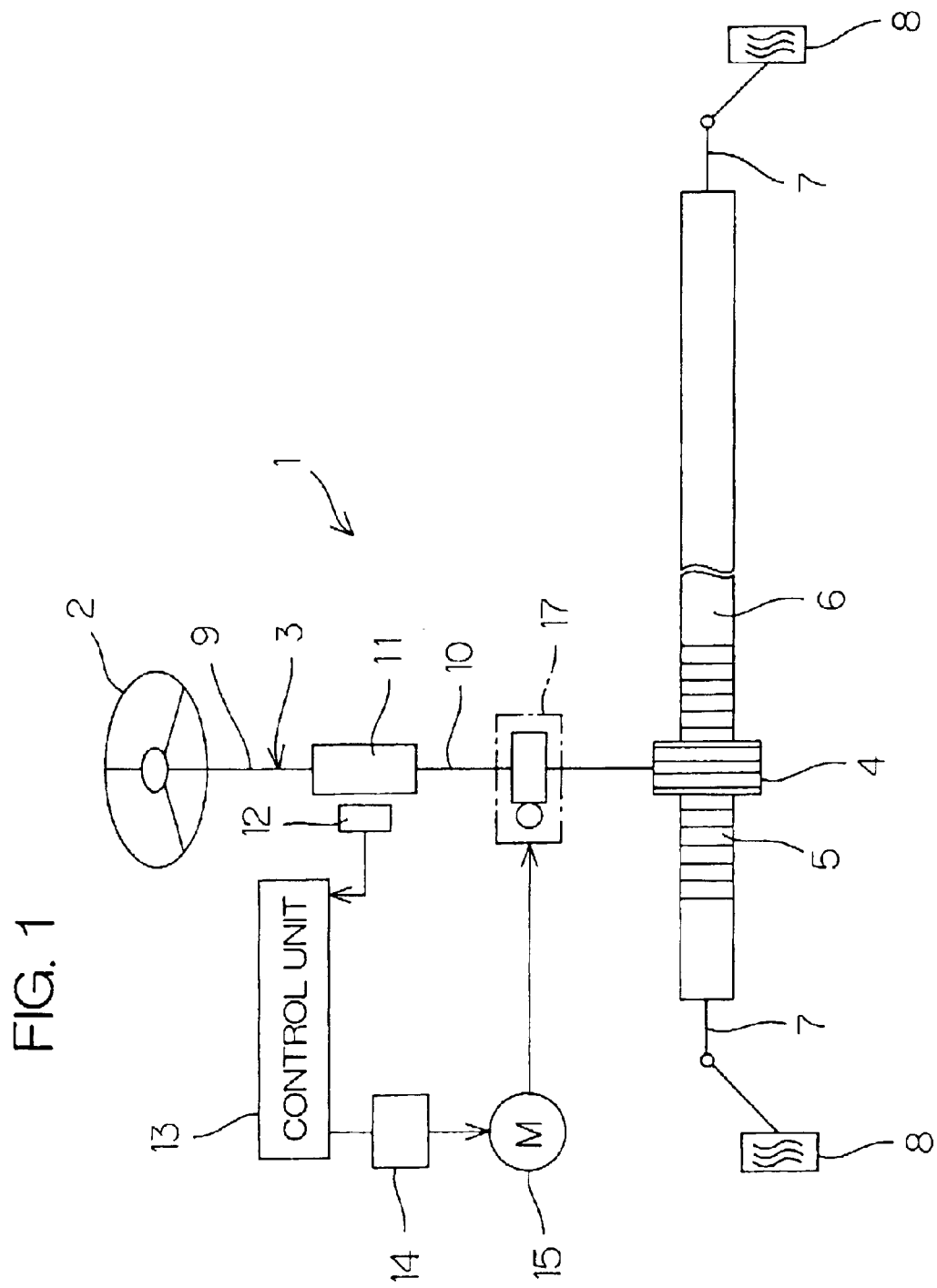
FIG. 1 is a schematic diagram illustrating the arrangement of an electric power steering apparatus comprising a worm speed reducer serving as a worm speed change apparatus according to an embodiment of the present invention.

FIG. 1 is a schematic diagram illustrating the arrangement of an electric power steering apparatus according to an embodiment of the present invention. In FIG. 1, the electric power steering apparatus 1 comprises a steering shaft 3 connected to a steering wheel 2, a pinion 4 disposed at the tip of the steering shaft 3, and a rack shaft 6 which forms a rack 5 meshed with the pinion 4 and which extends transversely of a vehicle body.

Connected to both ends of the rack shaft 6 are tie rods 7 which are connected to wheels 8 through corresponding knuckle arms (not shown). When the steering wheel 2 is operated to rotate the steering shaft 3, this rotation is converted into a linear motion of the rack shaft 6 in the transverse directions of the vehicle body by the pinion 4 and the rack 5. This steers the wheels 8.

The steering shaft 3 is divided into a first steering shaft portion 9 serving as a casing input shaft connected to the steering wheel 2, and a second steering shaft portion 10 serving as an output shaft connected to the pinion 4. These first and second steering shaft portions 9, 10 are connected to each other on the same axis through a torsion bar 11.

There is disposed a torque sensor 12 for detecting a steering torque based on the relative rotational displacement between the first and second steering shaft portions 9, 10 through the torsion bar 11. The torque detection result obtained by the torque sensor 12 is given to a control unit 13. The control unit 13 is arranged to control, based on the torque detection result, a voltage to be applied to a steering assistance electric motor 15 through a driver 14. The rotation of a rotary shaft 16 (See FIG. 2) of the electric motor 15, is transmitted to the second steering shaft portion 10 through a worm speed reducer 17 serving as a worm speed change apparatus, thus assisting the steering.

Figure 2:
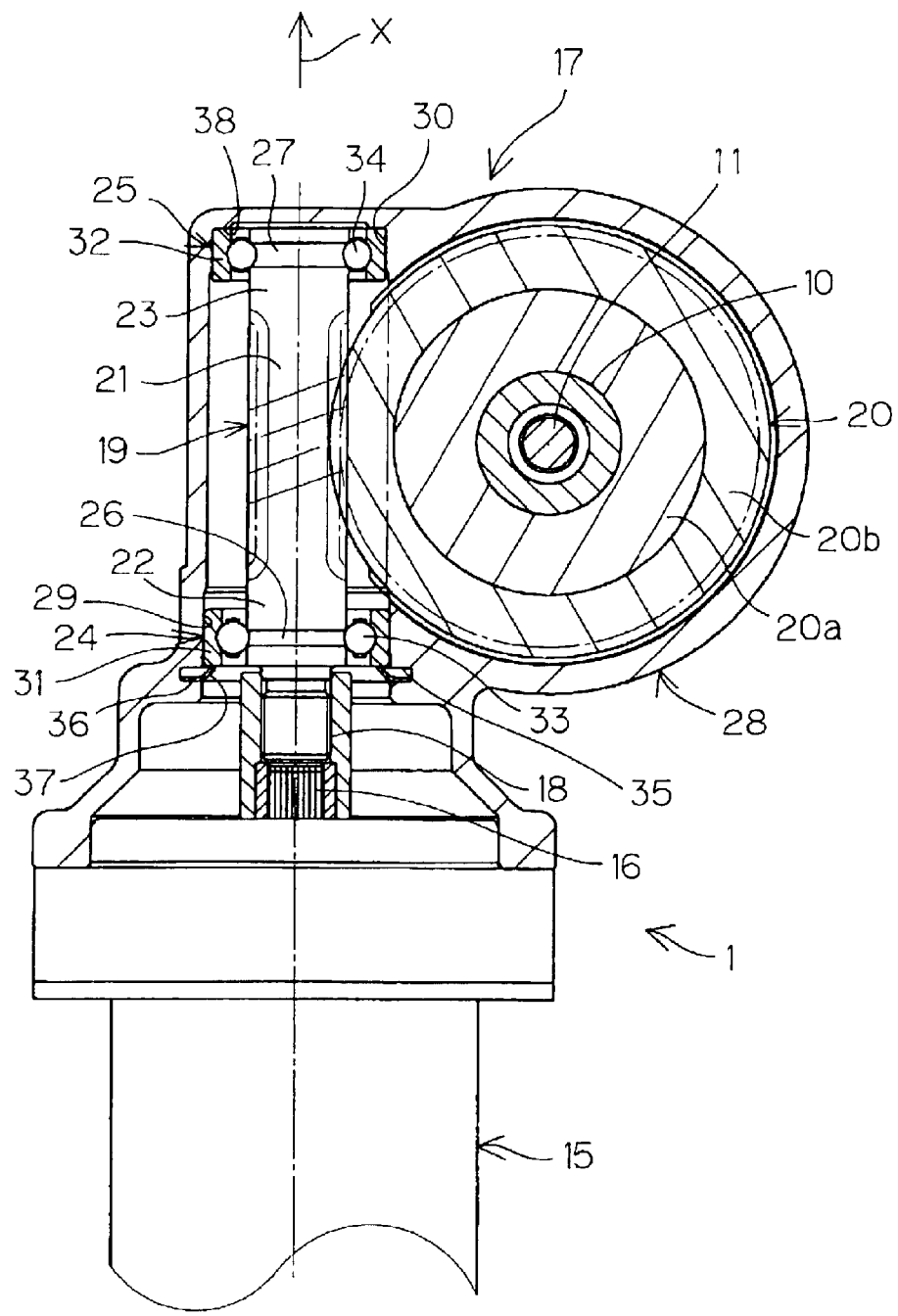
FIG. 2 is a sectional view of main portions of the electric power steering apparatus in FIG. 1.

Referring to FIG. 2, the worm speed reducer 17 comprises: a worm shaft 19 integrally rotatably connected to the rotary shaft 16 of the electric motor 15 for example through a joint mechanism including splines 18; and a worm wheel 20 serving as a reduction gear meshed with this worm shaft 19.

The worm wheel 20 comprises: an annular core body 20a integrally rotatably connected to the second steering shaft portion 10; and a synthetic resin member 20b which surrounds the core body 20a and which is provided on the outer periphery thereof with teeth. For example, the core body 20a is to be inserted into a mold at the time of resin molding of the synthetic resin member 20b. The synthetic resin member 20b is for example made of a polyacetal resin (POM), or a polyamide resin (PA: Nylon).

The worm shaft 19 is integrally provided at an intermediate portion in the longitudinal direction thereof with a worm tooth 21. The worm shaft 19 has first and second end portions 22, 23 opposite to each other in the longitudinal direction. The first and second end portions 22, 23 are respectively rotatably supported by first and second bearings 24, 25 comprising rolling bearings such as ball bearings or the like.

In the worm shaft 19, the first and second end portions 22, 23 respectively have raceway grooves 26, 27 comprising concaved grooves extending in the peripheral direction thereof. The worm shaft 19 and the worm wheel 20 are housed in a housing 28. The first and second bearings 24, 25 comprise: bearing outer rings 31, 32 held, as fitted in, by corresponding bearing holes 29, 30 in the housing 28; and rolling elements 33, 34 rotatably disposed between the bearing outer rings 31, 32 and the corresponding raceway grooves 26, 27.

A resilient tongue piece 37 extends from a snap ring 36 fitted in a peripheral groove 35 in the bearing hole 29 of the housing 28. This resilient tongue piece 37 comes in contact with one end face of the outer ring 31 of the first bearing 24. This resilient tongue piece 37 biases the outer ring 31 of the first bearing 24 toward the second bearing 25.

On the other hand, the end face of the outer ring 32 of the second bearing 25 comes in contact with a positioning step 38 at the bottom of the bearing hole 30 of the housing 28. This regulates the movement of the second bearing 25 in the direction X in FIG. 2.

The biasing force of the resilient tongue piece 37 is also given to the second bearing 25 through the first bearing 24 and the worm shaft 19. This gives a preload for biasing the first and second bearings 24, 25 in the direction X such that no inner gap is present.

According to the embodiment having the arrangement above-mentioned, the raceway grooves 26, 27 are formed directly in the worm shaft 19. This eliminates the bearing inner rings of prior art. This reduces the worm speed reducer 17 in size in the diametral direction of the worm shaft 19, resulting in reduction in the size of the electric power steering apparatus 1.

The elimination of the bearing inner rings can reduce not only the number of component elements, but also the number of assembling steps. As a result, the worm speed reducer 17 and subsequently the electric power steering apparatus 1 can be reduced in production cost. In particular, the equipment for pressing the end portions of the worm shaft 19 into the bearing inner rings, can be eliminated, thus further reducing the production cost.

Further, the elimination of the bearing inner rings can improve the rotational runout precision of the axis of the worm shaft 19. This contributes to reduction in vibration and noise.

In the embodiment above-mentioned, the outer ring 31 of the first bearing 24 is biased toward the second bearing 25 with the use of the resilient tongue piece 37 of the snap ring 36. However, the outer ring 31 may be biased with the use of a preload adjusting screw member to be threaded into a screw portion formed in the bearing hole 29. In such a case, the screw member may be fixed, after preload adjustment, with a lock nut to be engaged therewith.

Figure 3:
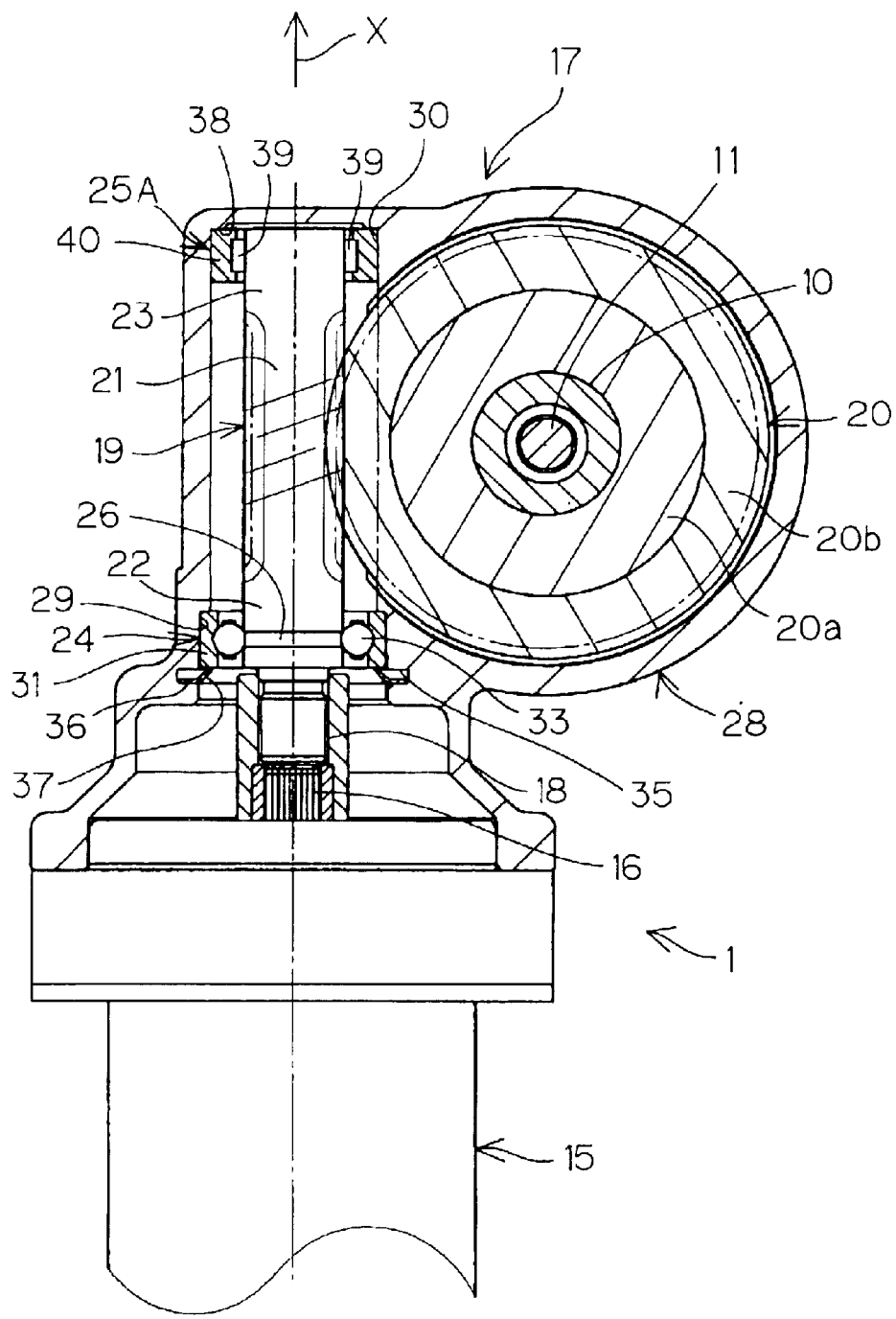
FIG. 3 is a sectional view of main portions of an electric power steering apparatus comprising a worm speed reducer serving as a worm speed change apparatus according to another embodiment of the present invention.

In the embodiment above-mentioned, ball bearings are used as the first and second bearings 24, 25. However, for example a cylindrical rolling bearing 25A such as a needle-like bearing or the like may be used as the second bearing as shown in FIG. 3. The cylindrical rolling bearing 25A comprises: an outer ring 40 held in a bearing hole 30; a plurality of cylindrical rollers 39 which are held by the bearing outer ring 40 and which come in rolling contact with the worm shaft 19; and a retainer (not shown).

Figure 4:
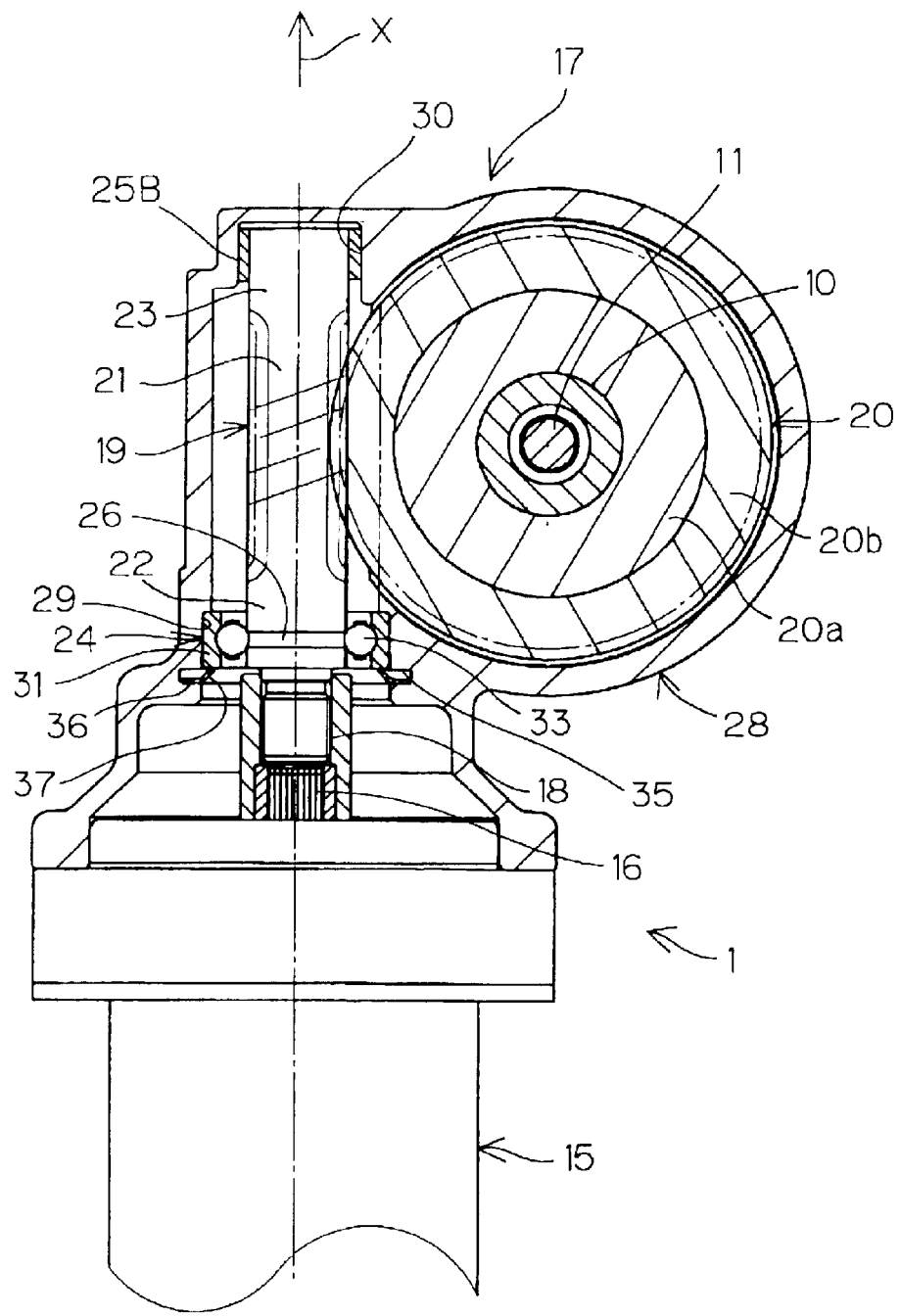
FIG. 4 is a sectional view of main portions of an electric power steering apparatus comprising a worm speed reducer serving as a worm speed change apparatus according to yet another embodiment of the present invention.

Further, there may be used, as the second bearing, a sliding bearing 25B such as a metal bush pressed in and fixed to the bearing hole 30 as shown in FIG. 4.

Further, there may be achieved a worm speed-up apparatus by making provisions such that the worm wheel 20 is driven and the worm shaft 19 is followed.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What we claim is:

1. A worm speed change apparatus comprising:

a housing having at least one bearing hole, the bearing hole having a peripheral groove formed therein:

a worm shaft having first and second end portions;

a worm wheel meshed with the worm shaft;

a raceway groove formed directly in at least the first end portion of the worm shaft;

a bearing outer ring which is held within the bearing hole of the housing and which is concentrically disposed around the raceway groove;

a plurality of rolling elements rotatably disposed between the bearing outer ring and the raceway groove, the first end portion of the worm shaft being directly received and rotatably supported by the rolling elements;

a bearing rotatably supporting the second end portion of the worm shaft; and a snap ring disposed in the peripheral groove, the snap ring having a resilient tongue that extends therefrom, the resilient tongue being in contact with an end face of the bearing outer ring, the resilient biasing the bearing outer ring toward the bearing supporting the second end portion of the worm shaft.

2. A worm speed change apparatus according to claim 1, wherein the rolling elements comprise balls.

3. A worm speed change apparatus according to claim 1, wherein the first end portion of the worm shaft is connected to a rotary shaft of an electric motor such that the driving force thereof is transmittable to the first end portion.

4. A worm speed change appartus according to claim 1, wherein
the first end portion of the worm shaft is connected to a rotary shaft of the electric motor such that the driving force thereof is transmittable to the end portion, and
the bearing rotatably supporting the second end portion of the worm shaft comprises a cylindrical rolling bearing or a sliding bearing.

5. A worm speed change apparatus according to claim 1, wherein the worm shaft has a constant diameter between the first and second end portions.

6. An electric power steering apparatus comprising:
a steering assistance electric motor, and
a worm speed change apparatus for changing the number of rotations of the electric motor,
the worm speed change apparatus comprising:
a housing having at least one bearing hole, the bearing hole having a peripheral groove formed therein:
a worm shaft having first and second end portions;
a worm wheel meshed with the worm shaft;
a raceway groove formed directly in at least the first end portion of the worm shaft;
a bearing outer ring which is held within the bearing hole of the housing and which is concentrically disposed around the raceway groove;
a plurality of rolling elements rotatably disposed between the bearing outer ring and the raceway groove, the first end portion of the worm shaft being directly received and rotatably supported by the rolling elements;
a bearing rotatably supporting the second end portion of the worm shaft; and
a snap ring disposed in the peripheral groove, the snap ring having a resilient tongue that extends therefrom, the resilient tongue being in contact with an end face of the bearing outer ring, the resilient tongue biasing the bearing outer ring toward the bearing supporting the second end portion of the worm shaft.

7. An electric power steering apparatus according to claim 6, wherein the rolling elements comprise balls or rollers.

8. An electric power steering apparatus according to claim 6, wherein the first end portion of the worm shaft is connected to a rotary shaft of an electric motor such that the driving force thereof is transmittable to the first end portion.

9. An electric power steering apparatus according to claim 6, wherein
the first end portion of the worm shaft connected to a rotary shaft of the electric motor such that the driving force thereof is transmittable to the end portion, and
the bearing rotatably supporting the second end portion of the worm shaft comprise a cylindrical rolling bearing or a sliding bearing.

10. An electric power steering apparatus according to claim 6, wherein the worm shaft has a constant diameter between the first and second end portions.

* * * * *